Sept. 29, 1959　　　　A. M. JENNEY　　　　2,906,983
SERVO-MOTOR POTENTIOMETER DRIVE CLUTCH AND BRAKING MECHANISM
Filed May 19, 1958　　　　　　　　　　　　2 Sheets-Sheet 1
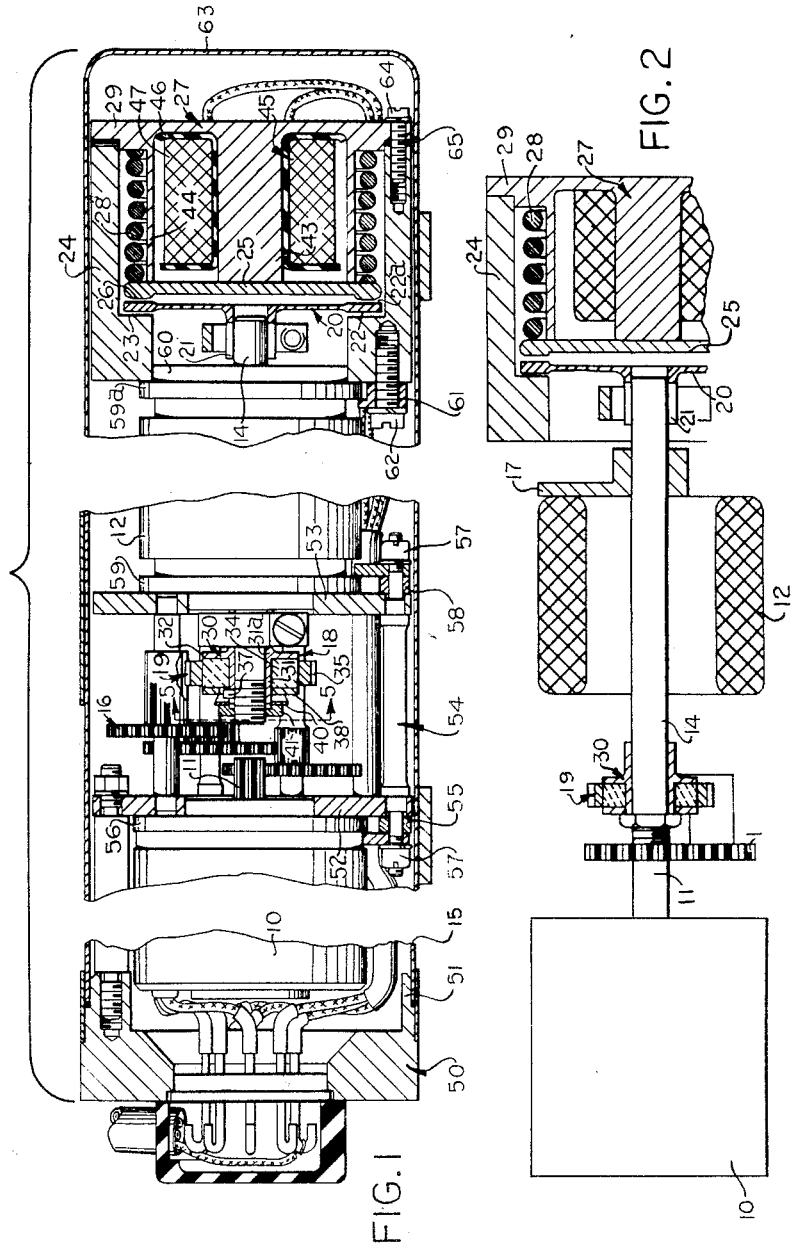
INVENTOR.
Alan M. Jenney
BY
ATTORNEYS Sept. 29, 1959         A. M. JENNEY         2,906,983
SERVO-MOTOR POTENTIOMETER DRIVE CLUTCH AND BRAKING MECHANISM
Filed May 19, 1958         2 Sheets-Sheet 2
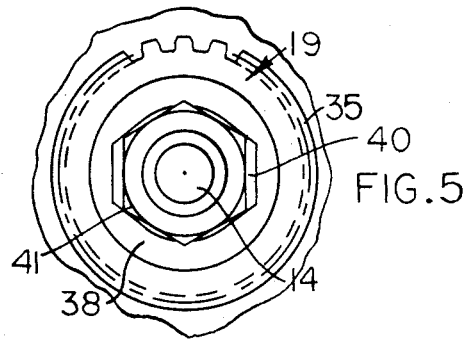
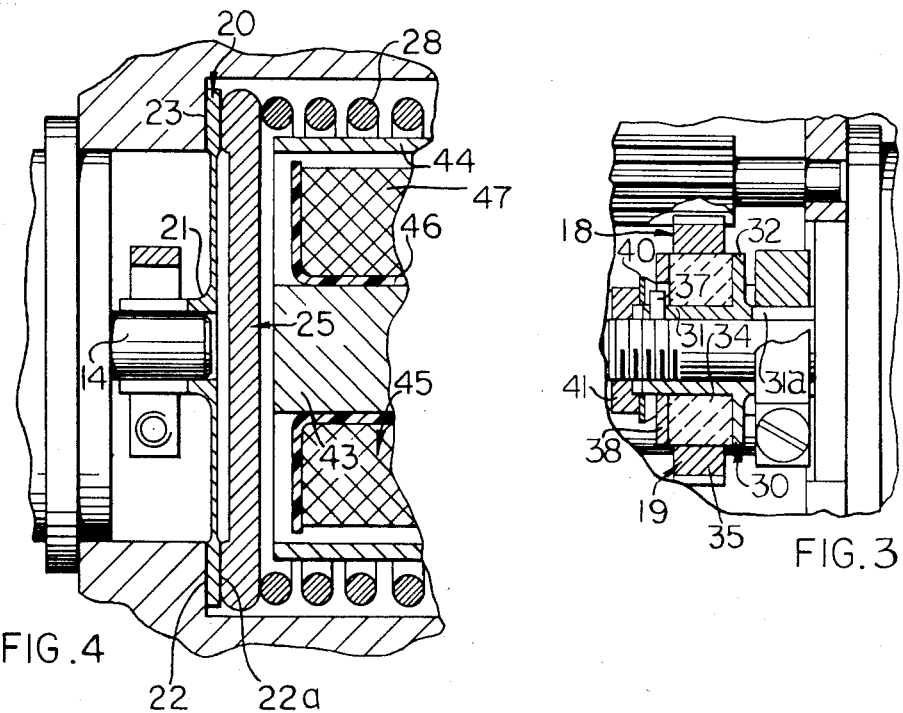
INVENTOR.
Alan M. Jenney
BY
ATTORNEYS

United States Patent Office 2,906,983
Patented Sept. 29, 1959

2,906,983

SERVO-MOTOR POTENTIOMETER DRIVE CLUTCH AND BRAKING MECHANISM

Alan M. Jenney, Clifton, N.J., assignor to Kearfott Company, Inc., Little Falls, N.J., a corporation of New York Application May 19, 1958, Serial No. 736,331

8 Claims. (Cl. 338—116)

This invention relates to servo motors and is particularly directed to a servo motor driven potentiometer adjustment shaft, which is used for continuously varying the voltage through a potentiometer, in order to co-ordinate and control a remotely mounted device to track radio transmission signals, and determine the frequency of transmission of the radio signals.

It is primarily directed to a potentiometer adjustment shaft drive mechanism, which is so constructed that it can determine in conjunction with an externally mounted apparatus, the exact frequency of transmission of a radio signal and co-ordinate the instantaneous voltage through the potentiometer with an external signal received from an external source.

The potentiometer is provided with a movable control contact attached to the potentiometer adjustment shaft, which varies the voltage through the potentiometer continuously, while the adjustable contact is in motion.

In order to arrest the movement of the adjustable contact of the potentiometer at a particular point in its rotation, or in co-ordination with a particular frequency setting of the externally mounted device, connected to and controlled by the potentiometer, means is provided for braking the adjustment shaft supporting the adjustable contact, so that a voltage is established through the potentiometer corresponding with the frequency of the desired signal in the remotely mounted device, or close to the desired frequency.

In order to provide varying degrees of adjustment of the voltage through the potentiometer, and consequently the frequency through the remotely mounted device, two types of apparatus are provided for co-ordinated utilization, one unit being utilized for relatively coarse tracking to determine the approximate range or band of the frequency of a signal received, and a corresponding voltage through the potentiometer, a second unit being provided to obtain a finer adjustment of the voltage through the potentiometer, and consequently of the frequency of the signal through the remotely mounted apparatus, in order to co-ordinate the range of the voltage through the potentiometer exactly with the frequency of the signal received in the externally mounted signal device.

As devices of this general character are primarily employed in conjunction with radio signals directed at jamming the operation of guided missiles and similar contrivances, the time interval between the time of receiving the signal and the time at which the frequency of the signal received is definitely established, is of critical importance.

A primary feature of the invention is the fact that the time interval between the start of the frequency tracking and the actual setting of the potentiometer voltage range in co-ordination with the radio signal frequency required is extremely short, the total elapsed time between the energizing of the brake control mechanism, and the actual arresting of the potentiometer adjustment shaft being of the order of .002 second.

As two separate and distinct potentiometer shaft speeds are employed, in two separate and distinct units, the total elapsed time between the energizing of the brake control means of the coarse tracking unit, and the final braking of the adjustment shaft supporting the adjustable contact of the potentiometer connected to and co-ordinated with the fine tracking means, including the transmission of the starting signal from one unit to the other, is usually less than .002 second.

Thus the actual elapsed time between the instant at which the range of the voltage through the potentiometer approaches that corresponding to the frequency of the signal through the externally mounted device, and the time at which the adjustment shaft of the potentiometer is completely arrested, is of the order of .001 second in each unit, including the coarse tracking unit, which is connected to the low speed potentiometer adjustment shaft and the fine tracking unit which is connected to the high speed potentiometer adjustment shaft.

This also requires that the co-ordination between the two units be extremely accurate and that the time interval between the braking of the adjustment shaft of the potentiometer of the first unit and the initiating of the brake actuating mechanism of the potentiometer shaft of the second or fine adjustment unit is so short as to be relatively instantaneous.

While in the embodiment of the construction, shown in the drawings, the servo motor, the potentiometer, the adjustment shaft of the potentiometer, the clutching mechanism and the braking mechanism, fitted to the potentiometer adjustment shaft, are co-axially aligned with one another and mounted in a substantially cylindrical axially aligned and co-ordinated housing, the actual arrangement of the various components of the apparatus may be varied considerably, depending upon the space available in a particular installation, and the size of the servo motor and the potentiometer used in conjunction therewith.

While directed primarily to a servo motor of extremely small size, with the other components, such as the potentiometer, of substantially the same or close to the same diameter, essentailly the same features of the construction and the operation of the apparatus may be employed with larger servo motors, and a proportionately larger potentiometer, the size and capacity of the clutching and braking mechanism being substantially proportionately varied to suit the requirements of a particular installation, the essential features of the construction, and the method of operation of the apparatus remaining substantially the same.

The combination may include two separate and distinct potentiometer speeds, in the manner hereinbefore described, or a single potentiometer speed, or a plurality of potentiometer units in a wider range of speeds, may be substituted therefor, the construction of the individual apparatus, and the method of controlling and co-ordinating the multiple apparatus, remaining substantially the same.

The accompanying drawings, illustrative of one embodiment of the invention, together with the description of its construction and the method of operation, co-ordination, control and utilization thereof, will serve to clarify further objects and advantages of the invention.

In the drawings:

Figure 1 is a vertical section through one embodiment of the assembled apparatus, including the servo motor, the potentiometer, the reduction gear train between the shaft of the servo motor and the adjustment shaft of the potentiometer, the clutching mechanism, and the adjustment means therefor, the braking mechanism and the electro-magnetic brake control mechanism used in conjunction therewith, the braking mechanism being shown in the released position.

Figure 2 is a schematic front elevation and partial longitudinal section through the assembled apparatus shown in Figure 1, showing schematically the operating elements of the apparatus, including the servo motor, the potentiometer, including the adjustment shaft and the wiper contact attached thereto, the reduction gear, the clutching mechanism and the drive means therefor, and the braking mechanism which is shown in greater detail in Figures 1 and 4.

Figure 3 is an enlarged longitudinal section through the clutching mechanism incorporated between the reduction gear train and the adjustment shaft of the potentiometer, shown in Figure 1.

Figure 4 is an enlarged longitudinal section through the braking mechanism fitted to the adjustment shaft of the potentiometer, shown in Figure 1, and the electromagnetic brake control mechanism used in conjunction therewith, with the brake shoe and the control mechanism therefor moved to the braking position.

Figure 5 is a left-hand side elevational view of the formed plate pressure spring controlled clutching mechanism, shown in Figures 1 and 3, and the means for adjusting the pressure on the plate spring, the view being taken on the line 5—5, Figure 1.

It will be understood that the following description of the construction and the method of operation, co-ordination and utilization of the "Servo Motor Potentiometer Drive and Braking Mechanism" is intended as explanatory of the invention and not restrictive thereof.

In the drawings, the same reference numerals designate the same parts throughout the various views, except where otherwise indicated.

One embodiment of the construction shown in Figure 1 and schematically in Figure 2, comprises a servo motor 10 having a central rotor having a central rotatable pinion shaft 11 fitted thereto, and an adjustable substantially circular potentiometer 12 with a rotatable adjustment shaft 14 extending through the casing of the potentiometer and projecting beyond both ends thereof, the adjustment shaft 14 of the potentiometer being co-axial with the rotor pinion shaft 11 of the servo motor.

The entire unit is mounted in a tubular housing 15, which is co-axial with the servo motor 10 and extends over the entire length of the assembled unit.

A reduction gear train 16 is incorporated between the pinion shaft 11 of the servo motor and the adjustment shaft 14 of the potentiometer, to reduce the motor shaft speed to the speed required on the potentiometer adjustment shaft 14, which is of the order of 30 or 60 r.p.m. depending upon the operating requirements of a particular installation.

A rotatable adjustment contact arm 17 shown schematically in Figure 2, is fixedly attached to the adjustment shaft of the potentiometer to vary the voltage through the potentiometer for reasons hereinafter described in greater detail.

In order to enable the shaft of the servo motor 10 to rotate freely while the potentiometer adjustment shaft 14 is arrested, a clutching mechanism 18 is incorporated between the potentiometer adjustment shaft drive gear 19, which is concentric with the servo motor shaft 11, and the adjustment shaft 14 of the potentiometer, as shown in Figures 1 and 3, the gear 19 being driven by the reduction gear train 16, which is in turn driven by the pinion shaft 11 of the servo motor 10. The detailed construction of the clutching mechanism is hereinafter described.

A substantially circular brake disc 20 having a central radially slotted tubular hub 21 integral therewith, is fixedly attached to the end of the adjustment shaft 14 of the potentiometer 12, projecting beyond the right-hand end of the potentiometer housing, the brake disc having an integral annular rim, which has two parallel braking surfaces 22, 22a adjacent the outer circumference thereof.

One of the braking surfaces 22, 22a of the brake disc 20, is located adjacent the flat face 23 at the bottom of a counterbore in the center of and co-axial with a magnetic brake housing 24, which is fitted to the right-hand end of the tubular housing, the magnetic brake housing supporting the potentiometer 12.

A flat substantially circular brake shoe 25, having a flat annular braking face 26, located in substantial alignment with the outer annular braking surface 22a of the brake disc, is mounted in the housing, between the brake disc and the open inner end of an electromagnetic core body 27, which is fitted to the interior of the magnetic brake housing 24, co-axially therewith.

A coiled compression spring 28, which is fitted to the interior of the counterbore in the magnetic brake housing, concentric therewith, is inserted between the brake shoe 25 and the inner surface of a flange 29 integral with the outer end of the electromagnetic core 27, the outer portion of the flange 29 of the electromagnetic core 27 being fixedly attached to the outer face of the electromagnetic brake housing 24.

The detailed operation of the electromagnetic control phases of the braking mechanism will hereinafter be described.

When the electromagnetic core is de-energized, the compression spring 28 forces the shoe 25 of the braking mechanism into the braking position shown in Figure 4, in which the brake disc is braked between the face of the magnetic brake housing 24 and the brake shoe 25, thereby arresting the rotation of the brake disc 20 and the potentiometer shaft 14 to which it is attached, and in that manner fixing the position of the potentiometer adjustment shaft 14 and the adjustable contact arm 17, which is attached to the potentiometer adjustment shaft, and establishing the voltage through the potentiometer 12, which is co-ordinated with the frequency of the signals in a remotely mounted signal apparatus, in the manner hereinafter described.

The maximum lateral movement of the brake shoe 25 from the free position shown in Figure 1, to the braking position shown in Figure 4 is extremely small, the distance being adjusted by a plurality of shims, so that the adjusted lateral movement of the brake shoe 25 is of the order of .004 from the free position to the braking position.

The clutching mechanism shown in Figures 1, 3 and 5 comprises a clutch hub 30, which consists of a tubular sleeve 31 fitted to the potentiometer adjustment shaft 14, one end 31a of the tubular sleeve being radially slotted to enable the tubular sleeve to be clamped to the potentiometer adjustment shaft, and a flat substantially circular flange 32 integral with the tubular sleeve, the face of the flange being substantially perpendicular to the longitudinal axis of the tubular sleeve 31.

A combination slip clutch and drive gear 19 is slidably and rotatably fitted to the outer circumference of the tubular sleeve 31 of the clutch hub 30. The clutch gear combination comprises a tubular inner clutch ring 34 formed of silver graphalloy, or other suitable clutching material, the outer surface of the clutch ring being molded into, or otherwise fixedly attached to the interior of a drive gear 35, having gear teeth around the outer circumference thereof, the drive gear being driven by the reduction gear train 16, which is in turn driven by the rotor pinion shaft 11 of the servo motor 10.

The tubular sleeve 31 of the clutch hub is rotatably controlled by the potentiometer adjustment shaft 14, by means of a cylindrical pin 37, or other suitable attaching means, fitted through the potentiometer adjustment shaft.

A flat, substantially circular clutch disc 38 is fitted to the outer circumference of the tubular sleeve 31, adjacent the flat surface of the tubular clutch ring 34, opposite the flange 32, the pin 37 being fitted to a slot through the clutch disc, thereby causing the clutch disc 38 to rotate with the clutch hub 30.

A formed plate spring 40, of arcuate cross-sectional contour, shown in Figures 3 and 5, is slidably fitted to the outer circumference of the tubular sleeve 31, the inner surface of the plate spring, which is of concave arcuate cross-sectional contour, being forced against the adjacent surface of the clutch disc 38 by a nut 41, threadably attached to the potentiometer adjustment shaft 14, thereby yieldably clamping the clutch disc and the face of the flange 32 against the silver graphalloy clutch ring 34, thereby allowing the drive gear 35 to drive the potentiometer adjustment shaft 14, when the clutch ring is held in engagement with the clutching faces of the clutch disc 38 and the flange 32, respectively, while the potentiometer adjustment shaft 14 is free to rotate.

The pressure against the clutch ring 34 is manually adjusted, by adjusting the pressure exerted by the plate spring 40 against the clutch disc, by means of the nut 41 which is fitted to the potentiometer adjustment shaft 14.

In order to limit the load on the clutching mechanism, the pressure of the formed plate spuring 40 is usually preset for the purpose of obtaining a clutch disc pressure of approximately 1 inch ounce, although this may be varied to suit the requirements of a particular application and to conform to the size and therefore the contact area of the clutch ring 34.

When the rotation of the potentiometer adjustment shaft 14 is arrested, by the braking mechanism shown in Figures 1 and 4, the plate spring 40 allows the clutch to slip, thereby allowing the rotor shaft of the servo motor to rotate freely while the potentiometer adjustment shaft is held stationary.

The electromagnetic brake control mechanism, which controls the movmeent of the brake shoe 25, is shown in Figures 1, 2 and 4.

The electromagnetic core 27, which is formed of a material having a high degree of permeability, such as Swedish iron, comprises a central substantially cylindrical core section 43, which is integral with the flange 29 and co-axial therewith, and a tubular shell 44, concentric with the core section, which is also integral with the flange 29, the shell and core sections forming an annular cavity therebetween, into which a coil assembly 45, such as that shown in Figures 1 and 4 is fitted, the coil assembly consisting of an inner liner 46 of substantially U-shaped cross-section, and a coil 47 wound around the inner liner, between the end flanges thereof. When the coil 47 is energized, the tubular shell and the central cylindrical section of the core are highly magnetized, thereby drawing the brake shoe 25 toward the free open face of the shell 44 and the cylindrical core section 43 of the electromagnetic core, into the free position shown in Figure 1, out of engagement with the circular brake disc 20.

The magnetic brake housing which surrounds the electromagnetic core 27, is made of a non-magnetic material, such as an aluminum alloy, so that it is not affected by the magnetizing current of the coil 47.

In the same manner, the circular brake disc 20 is also made of a high strength non-magnetic material, such as beryllium copper, which is not affected by the magnetization of the electromagnetic core 27.

When the coil 47 is de-energized, the electromagnetic core 27 is de-magnetized, thereby allowing the coiled compression spring 28 to force the brake shoe 25 from the free position shown in Figure 1 to the braking position shown in Figure 4, and in that manner gripping the circular brake disc between the brake shoe and the braking surface of the tubular housing 24, and arresting the rotation of the potentiometer adjustment shaft 14.

Operation

In order to alter the degree of variation of the voltage through the potentiometer 12, two types of units such as that shown in Figure 1 are utilized.

In one type, the reduction gear train 16 is selected in order to provide a potentiometer adjustment shaft speed of approximately 60 revolutions per minute. While the speed of the shaft of the servo motor will vary with the servo motor selected, the usual rotor shaft speed is of the order of 10,000 revolutions per minute, thus giving a reduction of the order of 166.67/1 for this type of unit.

With this unit, the voltage through the potentiometer and consequently the frequency of the signal through the remotely mounted apparatus to which the potentiometer is connected, is continuously varied, while the potentiometer adjustment shaft is rotated, until a potentiometer voltage corresponding to a signal frequency, closely approximating the frequency of the signal being tracked is reached, after which the adjustment shaft of the potentiometer is braked in the manner hereinbefore described, a signal of relatively uniform frequency being transmitted by the remotely mounted apparatus connected to the potentiometer.

A parallel unit fitted with a reduction gear to provide a final potentiometer adjustment shaft speed of approximately 30 revolutions per minute is connected into the same circuit, the lower speed unit being so connected that the rotation of the adjustment shaft of the potentiometer of the lower speed unit is set in motion when the rotation of the adjustment shaft of the potentiometer of the 60 r.p.m. unit is arrested.

The signal tracking is continued through a frequency range approximately that of the apparatus connected to the potentiometer 12, the adjustment shaft of which has been braked, until a potentiometer voltage which corresponds to a signal of almost the exact frequency required is reached, after which the adjustment shaft of the potentiometer of the fine adjustment unit, which is rotated at approximately 30 r.p.m., is braked, in the manner hereinbefore described, thereby establishing a voltage through the potentiometer, which corresponds in the remotely mounted tracking apparatus to a signal frequency almost exactly equal to the signal to be jammed, at which point the potentiometer adjustment shaft of the fine adjustment unit is braked in the manner hereinbefore described and the potentiometer voltage held substantially constant, so that the signal through the remotely mounted apparatus is maintained at the required frequency.

Because of the fact that in guided missile operation, it is essential that the desired signal frequency be established with a minimum of delay, it is important that the braking action of both units be initiated in a minimum of time.

In actual operation of the units above described, the elapsed time, from the time the tracking signal received by the potentiometer of the high speed unit reaches a voltage approaching that of the required signal control voltage, until the potentiometer adjustment shaft braking mechanism of this unit is fully applied, is of the order of .001 second.

The elapsed time, from the time at which the high speed adjustment shaft of one potentiometer is braked, until a voltage corresponding to the exact frequency required is established in the more sensitive potentiometer, fitted with a low speed adjustment shaft, and the low speed adjustment shaft of the sensitive potentiometer is braked, is also of the order of .001 second, so that the total elapsed time from the time a voltage corresponding to a signal frequency approximately that of the signal to be jammed is obtained in the potentiometer connected to the coarse scanning unit, until the time at which the potentiometer adjustment shaft of the potentiometer connected to the fine scanning unit is braked, and a potentiometer voltage corresponding to the exact signal frequency required is definitely established, is of the order of .002 second.

The signal frequency and consequently the voltage through the finely adjusted potentiometer fitted with a low-speed adjustment shaft, is continued at that rate until a change in frequency and consequently a change in potentiometer voltage is again required, or the unit is shut off entirely, at which point the operating cycle hereinbefore described is repeated.

While the combination unit hereinbefore described is primarily designed to operate in co-ordination with and under control of an apparatus which is operative to track and jam signals which are directed toward tracking a guided missile and thus interfere with its predetermined course and operation, essentially the same type of apparatus may be utilized for any type of potentiometer, in which a continuously varying voltage is required, with facilities for rapidly controlling and establishing a momentarily specifically required voltage, or for other types of unit in which a potentiometer adjustment shaft is driven by a servomotor.

While potentiometer adjustment shaft speeds of the order of 30 and 60 r.p.m. are indicated in this apparatus, these adjustment shaft speeds may be varied over a wide range, depending upon the type of reduction gear used and the type of potentiometer and the adjustment shaft therefor employed, the essential features of the clutching and braking mechanisms being substantially as shown in the drawings and hereinbefore described.

The material of which the clutch ring 34 is made and the diameter and consequently the face area of the clutch ring may be varied to suit the requirements of a particular application, including the speed at which the potentiometer adjustment shaft is rotated, the length of time during which the potentiometer adjustment shaft is braked, with the servomotor in operation, and the atmospheric conditions and other environmental conditions under which the apparatus is to be used.

In the same manner, the diameter and radial face width of the braking surfaces of the brake disc and the brake shoe which engages it, would also be varied to suit the requirements of the speed of rotation of the potentiometer adjustment shaft, and the other operating conditions encountered. This would also apply to the pressure of the compression spring against the surface of the brake shoe and the unit pressure applied against the braking surfaces of the circular brake disc.

At higher shaft speeds, or where increased braking pressures are required, the annular braking surfaces of the circular brake disc may either be coated with, or have attached thereto, a friction material, such as a brake lining, or a powdered metal or other type of surface coating, in order to increase the co-efficient of friction between the circular brake disc and the braking surfaces which it engages, including the annular housing surface and the face of the brake shoe.

Essentially the same type of clutching and braking mechanism may also be incorporated in other types of unit in which a high speed servo motor is connected to and drives any other type of electrical apparatus, in which almost instantaneous braking is required, under control of a signal received from a remotely mounted apparatus, and in which it is necessary or advisable to continue the operation of the servo motor while the apparatus driven by the servo motor is braked.

*Construction details*

One end of the tubular housing 15, in which the unit hereinbefore described is mounted, is attached to a substantially circular base 50, having a circular pilot 51 integral therewith, the pilot 51 being inserted into one end of the tubular housing, and the ends of the housing welded or otherwise fixedly attached to the circular base 50.

A pair of substantially circular mounting plates 52, 53 is slidably fitted to the interior of the tubular housing, adjacent the mounting surfaces of the flanges of the servo motor 10 and the potentiometer 12, respectively.

A plurality of substantially cylindrical spacer studs 54 having threaded ends integral therewith, is inserted through the mounting plates 52, 53, to spacedly locate the mounting plates relative to one another. A clamp 55 is fitted to one end of each of the spacer studs adjacent the flange 56 of the servo motor, a nut 57 threadably attached to the threaded stud end of each spacer stud being utilized to press the clamp 55 against the flange of the servo motor 10.

Similarly, another type of clamp 58 is fitted to the opposite end of each of the spacer studs 54, the clamp engaging the outer surface of the flange 59 of the potentiometer, a nut 57 pressing the clamp 58 against the flange 59 of the potentiometer, thereby clamping the potentiometer 12 to the mounting plate.

A circular pilot 60 integral with the flange 59a of the potentiometer, opposite the flange 59 which is clamped to the mounting plate 53, is fitted to a circular central opening through the magnetic brake housing 24, the flange 59a of the potentiometer engaging the adjacent face of the magnetic brake housing 24.

A plurality of stepped clamps 61, each of which is supported by a screw 62, threadably attached to the magnetic brake housing 24, is located around the outer flange 59a of the potentiometer 12, the screws 62 retaining the clamps 61 in engagement with the face of the magnetic brake housing.

The flange 56 of the servo motor 10 and the flange 59 of the potentiometer, each has a circular pilot integral therewith, in the same manner as the outer pilot 60 of the potentiometer 12, the pilots being accurately fitted to mating openings in the mounting plates 52, 53, thereby accurately centering the servo motor 10 and the potentiometer 12, within the housing 15, and retaining the adjustment shaft 14 of the potentiometer 12 in co-axial alignment with the pinion shaft 11 of the servo motor 10.

The right-hand end portion of the tubular housing 15, opposite the base 50, has a substantially circular hollow head 63 integral therewith, or fixedly attached thereto, thereby sealing the interior of the tubular housing 15.

The flange 29 of the electromagnetic core 27, located adjacent the open end of the magnetic brake housing, is attached to the brake housing by a plurality of screws 64, threadably fitted to the brake housing, a shim 65 in the form of a circular sector being fitted to each of the screws 64, thereby adjusting the lateral position of the flange 29 of the electromagnetic core and the open end of the magnetic brake housing 24, and in that manner adjusting the gap between the annular braking surface 23 in the interior of the magnetic brake housing 24, and the braking face of the brake shoe 25, thus accurately controlling the longitudinal travel of the brake shoe, from the free position shown in Figure 1, to the braking position shown in Figure 4.

While shown mounted in a tubular housing, the actual means of mounting the potentiometer and the clutch and braking mechanism therefor may be varied to suit the requirements of a particular application.

While the shaft of the potentiometer 12 is shown co-axial with the shaft of the servo motor, these shafts may be parallel to one another, perpendicular to one another, or located in any other desired relationship to one another, depending upon the requirements of and the space available in a particular application.

The clutching mechanism and the braking mechanism fitted to the adjustment shaft 14 of the potentiometer may be located at opposite ends of the adjustment shaft 14, or they may be located at one end of the adjustment shaft, the clutch hub 30 and the brake disc 20 being attached to the potentiometer adjustment shaft 14 in the same manner as those shown in Figures 1, 2 and 3, or by other suitable attaching means.

It will be apparent to those skilled in the art, that the present invention is not limited to the specific details described above and shown in the drawings, and that various modifications are possible in carrying out the features of the invention and the operation and the method of support, mounting, actuation, control and utilization thereof, without departing from the spirit and scope of the appended claims.

What is claimed is:

1. A servo motor combination including a servo motor having a central rotating shaft, a potentiometer having a central rotatable adjustment shaft co-axial with the shaft of the servo motor, spacedly located relative to the servo motor, the potentiometer adjustment shaft having an adjustable rotary contact fixedly attached thereto, operative to vary the voltage through the potentiometer, a reduction gear train operatively connecting the shaft of the servo motor with the adjustment shaft of the potentiometer to reduce the speed of rotation of the potentiometer adjustment shaft, relative to the shaft of the servo motor, a clutching mechanism incorporated between the reduction gear and the potentiometer adjustment shaft to enable the servo motor shaft to rotate while the rotation of the adjustment shaft of the potentiometer is arrested, one of the gears of the reduction gear train, which is concentric with the adjustment shaft of the potentiometer, being utilized to drive the clutching mechanism a spring loaded disc braking mechanism fitted to the potentiometer adjustment shaft, adapted to arrest the rotation of the potentiometer adjustment shaft, and electromagnetically operated means adapted to control the operation of the braking mechanism in one direction.

2. A servo motor combination as in claim 1, in which a clutching ring fixedly attached to the clutching mechanism drive gear, being mounted between a substantially circular flange supported by the potentiometer adjustment shaft, and a spring loaded disc located substantially parallel to the circular flange, to transmit the rotation of the clutching mechanism drive gear to the potentiometer adjustment shaft.

3. A servo motor combination, as in claim 1, in which the clutching mechanism includes a tubular sleeve fixedly attached to the potentiometer adjustment shaft, concentric with the drive gear, said drive gear having a substantially circular clutch ring fixedly attached thereto, surrounding the tubular sleeve, said tubular sleeve having a substantially circular flange integral with one end thereof, substantially perpendicular to the axis of the potentiometer adjustment shaft, said flange being adapted to engage one face of the clutch ring, a substantially circular disc slidably fitted to the tubular sleeve, adapted to engage the surface of the clutch ring, opposite the flange of the tubular sleeve, and spring means in engagement with said circular disc, adapted to press the circular disc against the clutch ring, to clamp the clutch ring between the circular disc and the flange of the tubular sleeve.

4. A servo motor combination, as in claim 1, in which the braking mechanism includes a tubular housing of substantially circular cross-section, having a flat annular braking face adjacent one end thereof, a substantially circular brake disc fixedly attached to the potentiometer adjustment shaft, one annular face of said circular brake disc being adapted to engage the annular braking face of the tubular housing, a substantially circular brake shoe fitted to the tubular housing, adjacent the annular face of the circular brake disc, opposite the tubular housing braking face, spring means adapted to force the brake shoe into engagement with the circular brake disc to arrest the rotation of the potentiometer adjustment shaft, and electro-magnetically controlled means adapted to draw the brake shoe out of engagement with the circular brake disc against the pressure of the spring means.

5. A frequency tracking device for tracking radio signals, comprising an externally mounted radio signal receiving and transmitting device, a servo motor having a central rotating shaft co-axial therewith, a potentiometer mounted co-axially with the shaft of the servo motor and spacedly located relative thereto, the potentiometer having a central adjustment shaft co-axial with the shaft of the servo motor, an adjustable rotary contact fixedly attached to the potentiometer adjustment shaft adapted to vary the voltage through the potentiometer, co-ordinated with the frequency of a signal through the externally mounted signal device, a reduction gear train operatively connecting the shaft of the servo motor with the adjustment shaft of the potentiometer, to reduce the speed of rotation of the potentiometer adjustment shaft relative to the shaft of the servo motor, a clutching mechanism incorporated between the reduction gear and the adjustment shaft of the potentiometer, to enable the servo motor shaft to rotate while the rotation of the adjustment shaft of the potentiometer is arrested, one of the gears of the reduction gear train, which is concentric with the adjustment shaft of the potentiometer, being utilized to drive the clutching mechanism, a clutching ring fixedly attached to the clutching mechanism drive gear being mounted between a substantially circular flange suported by the potentiometer adjustment shaft and a spring loaded disc located substantially parallel to the circular flange, to transmit the rotation of the clutching mechanism drive gear to the potentiometer adjustment shaft, a spring loaded disc braking mechanism fitted to the potentiometer adjustment shaft, adapted to arrest the rotation of the potentiometer adjustment shaft, and electromagnetically actuated means adapted to control the operation of the braking mechanism in one attitude.

6. A servo motor combination; including a servo motor having a central rotor shaft, a potentiometer having a central rotatable adjustment shaft spacedly located relative to the shaft of the servo motor, an adjustable contact arm fixedly attached to the potentiometer adjustment shaft adapted to vary the voltage through the potentiometer, a reduction gear train operatively connecting the shaft of the servo motor with the potentiometer adjustment shaft, to reduce the speed of rotation of the potiomenter adjustment shaft, relative to the shaft of the servo motor, a clutching mechanism incorporated between the reduction gear and the potentiometer adjustment shaft, to enable the servo motor shaft to rotate while the rotation of the potentiometer adjustment shaft is arrested, one of the gears of the reduction gear train, concentric with the adjustment shaft of the potentiometer, being adapted to drive the clutching mechanism, the clutching mechanism including a tubular sleeve fixedly attached to the potentiometer adjustment shaft, concentric with the drive gear, said drive gear having a substantially circular clutch ring fixedly attached thereto, surrounding the tubular sleeve, said tubular sleeve having a substantially circular flange integral with one end thereof, substantially perpendicular to the axis of the potentiometer adjustment shaft, said flange being adapted to engage one face of the clutch ring, a substantially circular disc slidably fitted to the tubular sleeve, adapted to engage the surface of the clutch ring, opposite the flange of the tubular sleeve, and spring means in engagement with said circular disc, adapted to press the circular disc against the clutch ring, to clamp the clutch ring between the circular disc and the flange of the tubular sleeve, a spring loaded disc braking mechanism fitted to the potentiometer adjustment shaft adapted to arrest the rotation of the potentiometer adjustment shaft, and electromagnetically controlled means adapted to control the operation of the braking mechanism, in one attitude.

7. A servo motor combination as in claim 6, in which the braking mechanism includes a tubular housing of substantially circular cross-section, co-axial with the potentiometer adjustment shaft, said tubular housing having an annular braking face adjacent one end thereof, a substantially circular brake disc fixedly attached to the potentiometer adjustment shaft, one face of said brake disc being adapted to engage the annular braking face of the tubular housing, a substantially circular brake shoe fitted to the tubular housing, adjacent the face of the brake disc opposite the tubular housing annular braking face, spring means fitted to said tubular housing, co-axial therewith, adapted to force the brake shoe into engagement with the circular brake disc to arrest the rotation of the potentiometer adjustment shaft, the electromagnetically controlled means being adapted to draw the brake shoe out of engagement with the circular brake disc, to release the brake disc, against the pressure of the spring means.

8. A servo motor combination, as in claim 6, in which the braking mechanism includes a tubular housing of substantially circular cross-section, co-axial with the potentiometer adjustment shaft, said tubular housing having a substantially flat annular braking face adjacent one end thereof, a substantially circular brake disc having a pair of integral substantially flat annular faces, fixedly attached to the potentiometer adjustment shaft, one annular face of said brake disc being adapted to engage the annular braking face of the tubular housing, a substantially circular brake shoe fitted to the tubular housing, adjacent the annular face of the brake disc opposite the face which engages the tubular housing annular braking face, spring means fitted to said tubular housing, co-axial therewith, adapted to force the brake shoe into engagement with the circular brake disc, to arrest the rotation of the potentiometer adjustment shaft, the electromagnetically controlled means including an electromagnetic core, of a high degree of permeability and substantially circular cross-section, co-axial with the potentiometer adjustment shaft, one edge of said electromagnetic core, substantially perpendicular to the axis thereof, being located adjacent the flat annular face of the brake shoe, opposite that which engages the circular brake disc, a coil mounted within said electromagnetic core, co-axially therewith, adapted to magnetize the electromagnetic core, said electromagnetic core being adapted to draw the brake shoe out of engagement with the circular brake disc, to release the brake shoe, against the pressure of the spring means, when the coil is energized.

References Cited in the file of this patent

UNITED STATES PATENTS

| | | |
|---|---|---|
| 995,915 | Schmidt | June 20, 1911 |
| 1,125,850 | Junkin | Jan. 19, 1915 |
| 1,414,709 | Reisbach | May 2, 1922 |
| 2,680,221 | Gilbert | June 1, 1954 |